United States Patent
Frank et al.

(10) Patent No.: US 7,280,141 B1
(45) Date of Patent: Oct. 9, 2007

(54) FIXED PATTERN NOISE SUBTRACTION IN A DIGITAL IMAGE SENSOR

(76) Inventors: Michael Frank, 718 Old San Francisco Rd., Apt. 236, Sunnyvale, CA (US) 94086; Ricardo J. Motta, 539 Hilbar La., Palo Alto, CA (US) 94303

( * ) Notice: Subject to any disclaimer, the term of this patent is extended or adjusted under 35 U.S.C. 154(b) by 806 days.

(21) Appl. No.: 10/670,014

(22) Filed: Sep. 23, 2003

(51) Int. Cl.
*H04N 9/64* (2006.01)

(52) U.S. Cl. ..................... 348/243; 348/241

(58) Field of Classification Search ........ 348/241–251, 348/252–253
See application file for complete search history.

(56) References Cited

U.S. PATENT DOCUMENTS

| | | | | |
|---|---|---|---|---|
| 4,675,738 A | * | 6/1987 | Okino et al. | 348/243 |
| 5,912,934 A | * | 6/1999 | Acks et al. | 376/248 |
| 6,061,092 A | * | 5/2000 | Bakhle et al. | 348/243 |
| 6,535,617 B1 | * | 3/2003 | Hannigan et al. | 382/100 |
| 7,173,656 B1 | * | 2/2007 | Dunton et al. | 348/243 |
| 2002/0044205 A1 | * | 4/2002 | Nagaoka et al. | 348/229 |

* cited by examiner

*Primary Examiner*—David Ometz
*Assistant Examiner*—Usman Khan

(57) ABSTRACT

A fixed pattern noise subtraction method in a digital imaging system incorporating a digital image sensor includes: acquiring a reference image of the digital image sensor when the digital image sensor receives no illumination, storing a reference value of an operating parameter associated with the reference image where the reference image is indicative of the fixed pattern noise associated with the digital image sensor, storing a model describing the behavior of the fixed pattern noise as a function of the operating parameter. Then, the method continues with acquiring a first image, measuring a current value of the operating parameter associated with the first image, calculating a noise prediction image by extrapolation of the reference image in accordance with the model and based on the current value and the reference value of the operating parameter, and subtracting the noise prediction image from the first image to generate a final image.

20 Claims, 4 Drawing Sheets

FIXED PATTERN NOISE SUBTRACTION IN A DIGITAL IMAGE SENSOR

FIELD OF THE INVENTION

The invention relates to digital image sensor systems and, in particular, to a method for subtracting fixed pattern noise in a CMOS digital image sensor.

DESCRIPTION OF THE RELATED ART

A digital imaging system for still or motion images uses an image sensor or a photosensitive device that is sensitive to a broad spectrum of light to capture an image of a scene. The photosensitive device reacts to light reflected from the scene and can translate the strength of that light into electronic signals that are digitized. Generally, an image sensor includes a two-dimensional array of light detecting elements, also called pixels, and generates electronic signals, also called pixel data, at each light detecting element that are indicative of the intensity of the light impinging upon each light detecting element. Thus, the sensor data generated by an image sensor is often represented as a two-dimensional array of pixel data.

A CMOS image sensor with pixel level analog-to-digital conversion is described in U.S. Pat. No. 5,461,425 of B. Fowler et al. (the '425 patent). Such an image sensor, referred to as a digital pixel sensor (DPS), provides a digital output signal at each pixel element representing the light intensity detected by that pixel element. The combination of a photodetector and an analog-to-digital (A/D) converter in an area image sensor helps enhance detection accuracy, reduce power consumption, and improves overall system performance.

CMOS image sensors generally exhibit fixed pattern noise that is visible as a stationary image pattern superimposed on captured images. Fixed pattern noise is considered one of the major weaknesses and deficiencies of CMOS digital image sensors. Fixed pattern noise is the result of multiple effects that yield variations and nonuniformity in individual pixel performance and response to light.

First, CMOS image sensors typically suffer from temperature dependent dark current that reduces the signal to noise ratio of the image sensor and limits the sensitivity of the image sensor. Dark current generally relates to the leakage current from the photodiodes or photo-transistors that are used as the light detecting elements in the image sensor. To make matters worse, the dark current is not spatially uniform but rather is randomly distributed and varies as a function of pixel location on the image sensor. As a result, when a CMOS image sensor is used to capture an image, the dark current associated with each pixel becomes a fixed pattern noise image superimposed on the desired image. The fixed pattern noise image is particularly visible in dark scenes and results in reduced sensitivity of the image sensor.

Other factors contributing to fixed pattern noise in a CMOS image sensor include spatially non-uniform capture of light, spatial variation in analog-to-digital conversion, and spatial parametric variation in the pixel circuitry in the image sensor. These factors can be a result of spatial variations in the optical filter structure on top of the sensor, spatial variation in the micro lenses on top of the sensor, spatial variation in the conversion efficiency of the photodiodes, voltage drop across the pixel array, and spatial variation in the transistor threshold voltage, transistor gain and geometries.

Fixed pattern noise in a CMOS image sensor is a unique image for each image sensor and the fixed pattern noise may vary as a function of image brightness, temperature, operating voltage, and other operating parameters. To increase the sensitivity of the image sensor and to improve the quality of the captured images, it is desirable to remove the fixed pattern noise from the captured images to increase the sensitivity of the image sensor and the quality of the captured images. In general, fixed pattern noise is time invariant and can be removed from a captured image if the pattern is known. However, because the fixed pattern noise can vary with various operating conditions, the fixed pattern noise image will vary accordingly making elimination of the image difficult.

Conventional methods for fixed pattern noise subtraction are unsatisfactory. U.S. Pat. No. 6,061,092 discloses a method for eliminating fixed pattern noise by storing a large number of fixed pattern noise images, also called dark images, in a host computer and then retrieving the dark images from the host computer based on different operation parameters of the camera. Such method requires large amount of memory and requires the image sensor to be tethered to a host computer which is not practical for portable applications. U.S. Pat. No. 6,535,617 discloses a method for removal of fixed pattern noise by estimating the fixed noise pattern from a composite image which composite image is derived by summing multiple image frames captured at a uniform illumination. Then, for each frame of image, the fixed pattern noise is estimated as a dot product of the image frame and the normalized filtered composite image. This method is not satisfactory because it does not take into consideration changes in the fixed pattern noise due to operating parameters of the image sensor. For example, fixed pattern noise usually varies with temperature. As temperature changes, the fixed pattern noise either becomes more pronounced or fades away. A fixed pattern noise removal method that does not take into consideration the temperature variation of the fixed pattern noise is ineffective in removing the noise component in a captured image.

Therefore, an improved method for accurately determining fixed pattern noise and subtracting the fixed pattern noise from images captured by a digital image sensor is desired.

SUMMARY OF THE INVENTION

According to one embodiment of the present invention, a method for subtracting fixed pattern noise in a digital imaging system incorporating a digital image sensor includes: acquiring a reference image of the digital image sensor when the digital image sensor receives no illumination, storing a reference value of an operating parameter associated with the reference image where the reference image is indicative of the fixed pattern noise associated with the digital image sensor when the operating parameter has the reference value, storing a model describing the behavior of the fixed pattern noise as a function of the operating parameter. Then, the method continues with acquiring a first image, measuring a current value of the operating parameter associated with the first image, calculating a noise prediction image by extrapolation of the reference image in accordance with the model and based on the current value and the reference value of the operating parameter, and subtracting the noise prediction image from the first image to generate a final image.

In one embodiment, the fixed pattern noise subtraction method of the present invention is implemented in a video imaging system including a digital image sensor and a digital image processor.

The present invention is better understood upon consideration of the detailed description below and the accompanying drawings.

DETAILED DESCRIPTION OF THE PREFERRED EMBODIMENTS

In accordance with the principles of the present invention, a method for fixed pattern noise subtraction is implemented in a digital imaging system incorporating a digital image sensor to estimate and remove fixed pattern noise from a captured image. The fixed pattern noise subtraction method involves acquiring a reference image indicative of the fixed pattern noise of the image sensor, storing reference values of operating parameters associated with the reference image, capturing an image, measuring the current values of operating parameters of the captured image, and calculating a prediction of the fixed pattern noise for the captured image by extrapolating from the reference image where the extrapolation is based on a model of the fixed pattern noise as a function of the values of the operating parameters. The noise prediction can then be subtracted from the captured image to generate a final image free of fixed pattern noise. In one embodiment, the subtraction is performed only when the captured image is a low illumination image, such as an image with pixel data at or below a given illumination threshold. The fixed pattern noise subtraction method of the present invention is capable of almost completely removing all fixed pattern noise associated with pixels in a digital image sensor. When the fixed pattern noise subtraction method of the present invention is implemented in an image sensor, the sensitivity of the image sensor can be greatly enhanced, especially for low light images.

Figure 1:
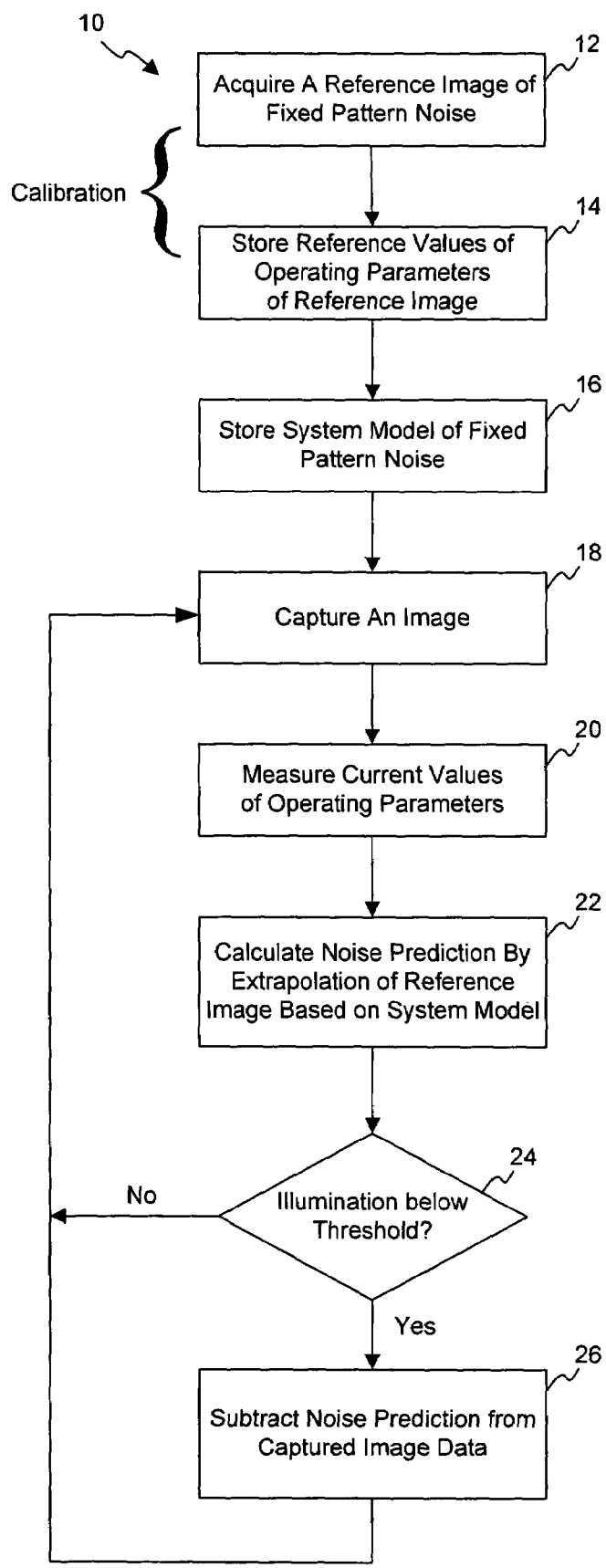
FIG. 1 is a flow chart illustrating the fixed pattern noise subtraction method according to one embodiment of the present invention.

FIG. 1 is a flow chart illustrating the fixed pattern noise subtraction method according to one embodiment of the present invention. Fixed pattern noise subtraction method 10 can be implemented in any digital imaging systems incorporating a digital image sensor and is particularly useful when implemented in imaging systems using CMOS image sensors for eliminating fixed pattern noise. Generally, the fixed pattern noise subtraction method of the present invention is an open loop algorithm. Fixed pattern noise subtraction method 10 of the present embodiment performs calibration of the image sensor either once during in-system manufacturing, once during image sensor manufacturing, or once every time the image sensor is powered up to obtain a reference image and that reference image is used for fixed pattern noise removal in all images subsequently captured by the image sensor. When the calibration is performed once during image sensor manufacturing, some kind of tracking between a specific image sensor and the associated reference image is required. For example, a "birth certificate" for each image sensor can be used to associate an image sensor with the reference image.

Referring to FIG. 1, fixed pattern noise subtraction method 10 starts by calibrating the image sensor. Calibration of the image sensor involves acquiring a reference image of the fixed pattern noise (step 12) and storing the reference values of operating parameters associated with the reference image when the image was taken (step 14). In the present embodiment, calibration is only performed once for each image sensor and is usually performed in-system for each image sensor. That is, the calibration is performed after the image sensor is incorporated in an imaging system, such as a video camera or a still-motion digital camera. The reference image indicative of the fixed pattern noise associated with that image sensor is stored in the imaging system so that the reference image can be used subsequently to eliminate fixed pattern noise from captured images for that image sensor. When the calibration is only performed once, the reference image should be stored in a permanent or non-volatile memory of the imaging system, such as a flash memory. It is instructive to note that the fixed pattern noise subtraction method of the present invention requires only the storage of one reference image and associated reference values. Therefore, it is possible to store the data in the imaging system in which the image sensor is incorporated. The fixed pattern noise subtraction method of the present invention does not require the use of a large amount of memory or a host computer to store the reference image.

In another embodiment, calibration is performed for the image sensor every time the image sensor or the imaging system in which the image sensor is incorporated is powered up. Alternately, the user of the imaging system can initiate the calibration. In these cases, a temporary memory or volatile memory, such as a SRAM, can be used to store the reference image and the associated reference values. In yet another embodiment, calibration is performed at image sensor manufacturing time. A "birth certificate" associated with each image sensor is used to associate an image sensor with the reference image data belonging to that image sensor.

Figure 2:
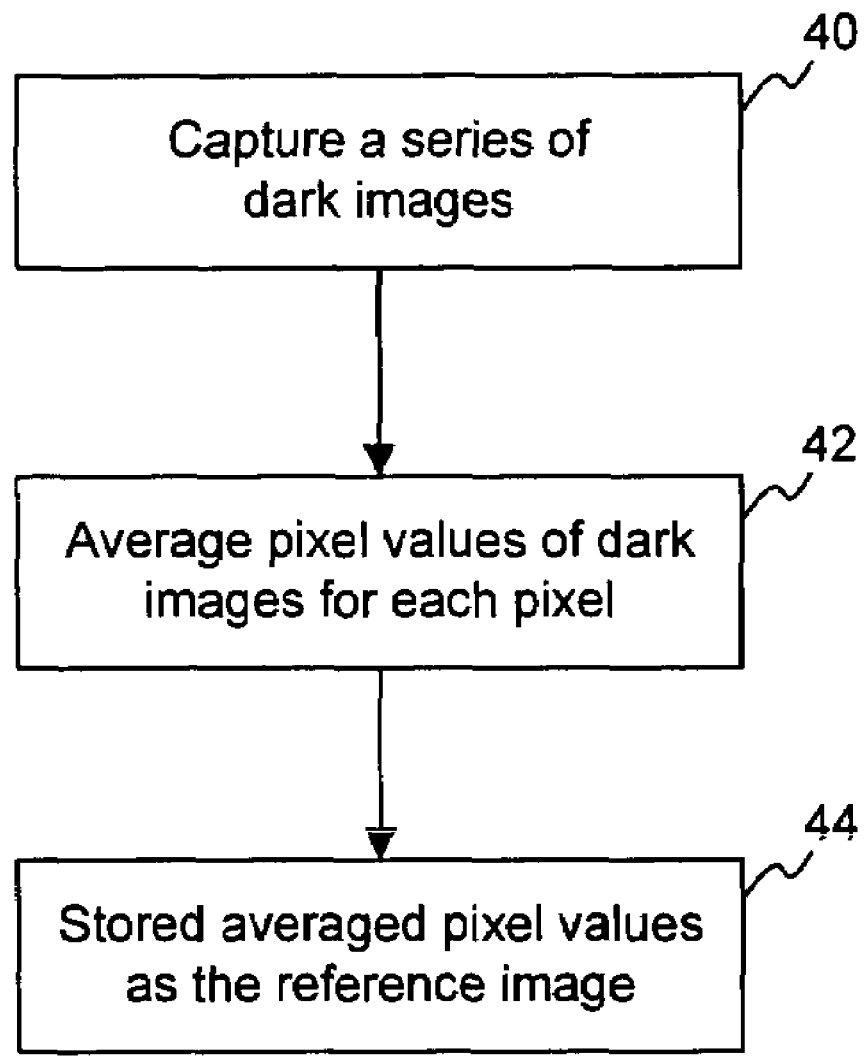
FIG. 2 is a flow chart illustrating the method for acquiring a reference image of the fixed pattern noise according to one embodiment of the present invention.

In one embodiment, the calibration process of the image sensor is performed as follows. FIG. 2 is a flow chart illustrating the method for acquiring a reference image of the fixed pattern noise according to one embodiment of the present invention. Referring to FIG. 2, a series of dark images are captured using the image sensor (step 40). The dark images can be taken by closing the aperture of the imaging system so that the image sensor is not exposed to any light. The reference image is generated by averaging the pixel values of the multiple dark images for each pixel (step 42). By averaging multiple dark images, random noise components of the dark images can be removed. The resulting reference image is indicative of the fixed pattern noise associated with the image sensor and can be stored for use in fixed pattern noise removal later (step 44).

Returning to FIG. 1, the calibration process of fixed pattern noise subtraction method 10 of the present invention continues with storing the reference values of operating parameters associated with the reference image being captured (step 14). Because the fixed pattern noise of the image sensor can vary with operating conditions such as temperature, illumination level, and exposure time, these variations need to be accounted for so that accurate fixed pattern noise removal can be performed. In accordance with the present invention, the reference values of the operating parameters are stored so that the parameters can be used to predict accurate noise values of the captured images.

In the present embodiment, the operation parameter being measured and stored include the dark current of the photodetectors which dark current is used as an indicator for the operating temperature of the image sensor. Dark current is the leakage current of "dark pixels" in the image sensor. Dark pixels are permanently and totally shadowed, such as covered by a metal layer. The image sensor may include one dark pixel or one or more columns or rows of dark pixels. Generally, a more accurate dark current measurement can be made by measuring the dark current of multiple dark pixels and averaging the dark current values to remove random noise. The leakage current of a photodiode or a phototransistor has a known dependency on temperature. Therefore, it is possible to use the amount of leakage current of the dark pixels when the reference image is captured as an indicator of the temperature at which the reference image is captured. Note that the dark current measurement is also dependent on other operating conditions, such as voltages. Some of these effects may also, at least partially, cancel out. However, in most applications, the dark current measurement is a sufficiently good indicator of the temperature of the image sensor.

The calibration of the image sensor is completed when the reference image for the image sensor is acquired and the reference values of the operating parameters associated with the reference image is stored. To implement fixed pattern noise subtraction method 10, the imaging system in which the image sensor is incorporated also needs to store a system model describing the behavior of the fixed pattern noise as a function of the operating parameters (step 16). The system model can be derived from known characteristics of photodiodes and phototransistors. The system model can also be derived experimentally by analyzing data collected from a large number of image sensors. Based on the data acquired for a large number of images from multiple image sensors taken at various temperature, operating voltage and exposure times, the fixed pattern noise can then be modeled as a function of the operating parameters. The process of deriving a system model for the fixed pattern noise is not critical to the practice of the present invention. Fixed pattern noise subtraction method 10 only requires a model describing the behavior of the fixed pattern noise as a function of the operating parameters to be stored in the imaging system.

In one embodiment, the system model used in the fixed pattern noise subtraction method 10 describes the behavior of the fixed pattern noise as a function of one or more of the following operating parameters: (1) the nature of exposure, such as the amount of light impinging on the image sensor and the wavelength of the incident light; (2) the duration of the light exposure; (3) the temperature of the image sensor as indicated by the leakage current or dark current; (4) location of the pixels in the image sensor; (5) the reset voltage of the photodetectors; and (6) the operating voltage of the image sensor.

In the present embodiment, fixed pattern noise subtraction method 10 of the present invention utilizes only the temperature, as measured by the average dark current of the dark pixels, as the operating parameter of interest. Because the dark current has a well-known exponential dependency on temperature, the dark current can be used as an effective indicator of temperature. Thus, the imaging system stores a system model of the fixed pattern noise variation with respect to temperature.

After calibration of the image sensor is performed, the image sensor and the imaging system in which the image sensor is incorporated can be used to capture images. At step 18, the image sensor is activated to capture an image of interest. Fixed pattern noise subtraction method 10 proceeds to measure the current values of the operating parameters (step 20), that is, the values of the operating parameters associated with the current image being captured. In the present embodiment, the operating parameter of interest is temperature and fixed pattern noise subtraction method 10 ascertains the current operating temperature by measuring the leakage current of the dark pixels in the image sensor.

Then, a noise prediction for each pixel of the current image is calculated (step 22). The noise prediction is calculated by extrapolating the pixel values of the reference image based on the current values of the operating parameters as compared to the reference values of the operating parameters. Specifically, the extrapolation applies the stored system model of the fixed pattern noise as a function of the operating parameters. In the present embodiment, the extrapolation is performed based on a comparison of the temperature of the reference image and the temperature of the captured image, as measured by the dark current of the image sensor. The stored system model of the fixed pattern noise as a function of temperature is used to determine what the pixel values for the reference image should be when the temperature varies from the reference temperature level to the current temperature level.

Using the system model of the fixed pattern noise as a function of temperature, a noise prediction for the current image of the image sensor is calculated. The noise prediction can be subtracted from the captured image to generate a final image free of fixed pattern noise.

In the present embodiment, fixed pattern noise subtraction is only activated when the illumination is below a certain threshold level since fixed pattern noise is visible mainly in low light conditions. Referring to FIG. 1, fixed pattern noise subtraction method 10 determines the illumination level of the captured image to determine if it is above or below a pre-selected threshold (step 24). The illumination level of the captured image can be measured by taking an average of pixel values of selected pixels which pixels are distributed through the image. When the illumination level of the captured image is above the threshold, no fixed pattern noise subtraction is performed and fixed pattern noise subtraction method 10 returns to step 18 to await the capture of another image.

If the illumination level of the captured image is at or below the threshold, then fixed pattern noise subtraction method 10 proceeds to step 26 where the noise prediction calculated previously for each pixel is subtracted from the respective pixel values of the captured image to provide a final image free of fixed pattern noise. Then, fixed pattern noise subtraction method 10 returns to step 18 to await the capture of another image.

In yet another embodiment, a gradual activation of the fixed pattern noise subtraction is applied. Specifically, depending on the illumination or temperature condition, a variable number of bits may be allocated for storing the noise prediction data relating to the fixed pattern noise. When the illumination is at or below a certain threshold (that is, the scene gets darker), the pixel data for the real image becomes less important and can be expressed in fewer bits while the fixed pattern noise becomes more visible and can be expressed in more bits. Thus, depending on the illumination conditions, variable number of bits can be allocated for the noise prediction data so that more precise noise prediction values can be applied when the fixed pattern noise is more visible.

For instance, a full m-bit of the noise prediction value is applied when the temperature is above a predetermined temperature level while fewer than m bits of noise prediction value is applied when the temperature is below the predetermined temperature level. Alternately, the fixed pattern noise subtraction method of the present invention can apply a full m-bit of the noise prediction value only when the light intensity is below a certain level where the level is below the pre-selected threshold used in step 24. When the light intensity is above the threshold level, fewer than m bits of noise prediction is used and the unused bits can be used to store pixel data relating to the real image. Specifically, the application of the noise prediction can be tailored so that full m-bit noise subtraction is performed only in conditions where fixed pattern noise is known to be most prevalent. In this manner, the pixel values of the captured image is preserved as much as possible and noise subtraction is performed only when fixed pattern noise substantially contribute to the degradation of the captured images.

The fixed pattern noise subtraction method of the present invention can be applied to a variety of digital imaging systems incorporating digital image sensors. In one embodiment, the fixed pattern noise subtraction method of the present invention is applied in a video imaging system including a digital image sensor component and a digital image processor component. Such a video imaging system is described in copending and commonly assigned U.S. patent application Ser. No. 10/634,302, entitled "A Video Imaging System Including A Digital Image Sensor And A Digital Signal Processor," filed Aug. 4, 2003, of Michael Frank et al., which patent application is incorporated herein by reference in its entirety.

Figure 3:
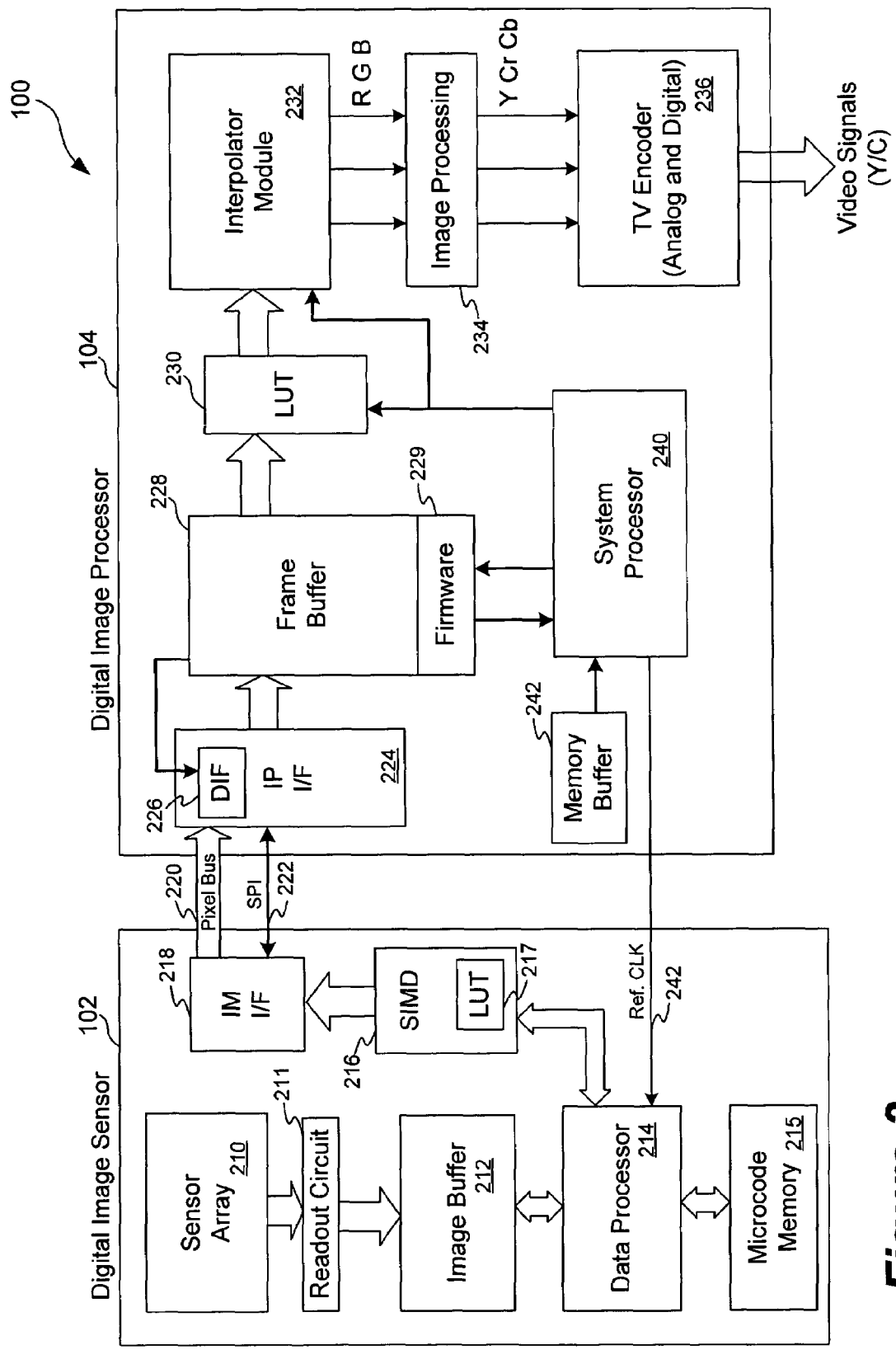
FIG. 3 is a block diagram of a video imaging system based on FIG. 1 of U.S. patent application Ser. No. 10/634,302 and modified to implement the fixed pattern noise subtraction method according to one embodiment of the present invention.

FIG. 3 is a block diagram of a video imaging system based on FIG. 1 of the aforementioned '302 patent application and modified to implement the fixed pattern noise subtraction method according to one embodiment of the present invention. In brief, digital image sensor 102 of video imaging system 100 is an operationally "stand-alone" imaging system operative to capture image data and provide entire frame of image data to digital image processor 104 for processing. Digital image processor 104 includes a frame buffer for storing the image data transferred from digital image sensor 102 and processing the image data based on instructions from system processor 240.

Figure 4:
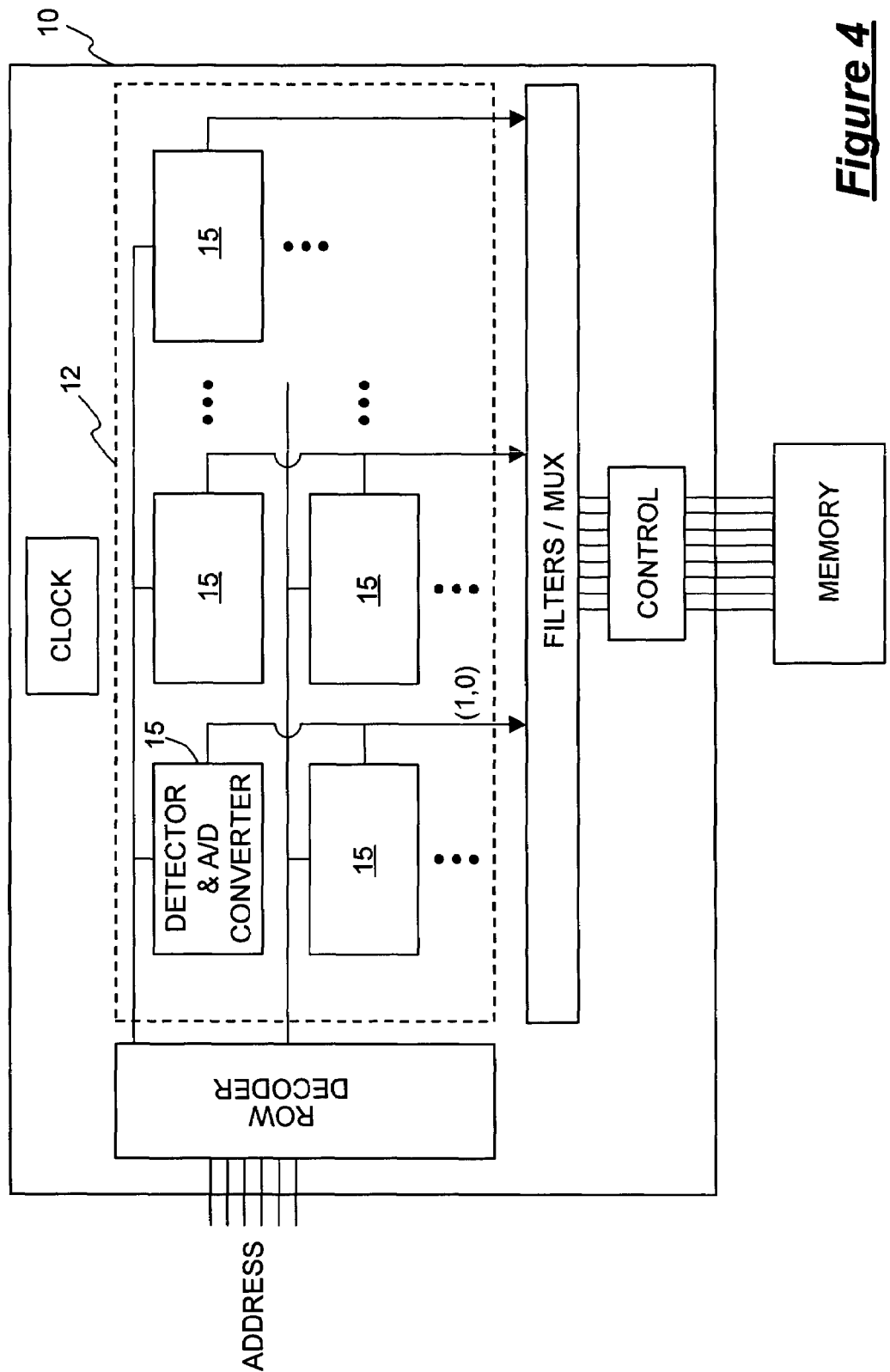
FIG. 4 is a block diagram of a digital image sensor as described in U.S. Pat. No. 5,461,425 of Fowler et al.

In one embodiment, image sensor 102 is a digital image sensor implemented as a digital pixel sensor (DPS), that is a CMOS image sensor with pixel level analog-to-digital conversion capabilities, as described in the aforementioned '425 patent. In the present description, a digital pixel sensor (DPS) array or a sensor array refers to a digital image sensor having an array of photodetectors where each photodetector produces a digital output signal. In one embodiment of the present invention, the DPS array implements the digital pixel sensor architecture illustrated in FIG. 4 and described in the aforementioned '425 patent. The DPS array of the '425 patent utilizes pixel level analog-to-digital conversion to provide a digital output signal at each pixel. The pixels of a DPS array are sometimes referred to as a "sensor pixel" or a "sensor element" or a "digital pixel," which terms are used to indicate that each of the photodetectors of a DPS array includes an analog-to-digital conversion (ADC) circuit, and is distinguishable from a conventional photodetector which includes a photodetector and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

When fixed pattern noise subtraction method 10 of the present invention is incorporated in video imaging system 100 of FIG. 3, the reference image and reference values can be stored in a memory buffer 242 accessible by system processor 240 for generating the noise prediction for each pixel value. In one embodiment, the noise prediction is stored in a memory buffer separate from frame buffer 228 of digital image processor 104. For example, the noise prediction can be stored in memory buffer 242 as well. However, in an alternate embodiment of the present invention, a unified memory, such as the frame buffer, is used to store the pixel values of the noise prediction as well as the pixel values of the captured image. Using a unified memory to store the noise prediction as well as the captured image has the advantage of efficient memory usage by allowing the reuse of memory locations in the frame buffer not used by the captured image to store the reference image. For instance, when digital image processor 104 stores pixel data in m bits, a captured image taken at low light conditions can be expressed in less than m bits. Thus, when the captured image and the noise prediction are stored in the same memory, such as frame buffer 228, memory locations not used to store the captured image can be used to store more bits of the noise prediction so that more precise noise prediction values can be stored.

In one embodiment, frame buffer 228 is organized to store 12 bits per pixel. The frame buffer is partitioned into two bit fields: one bit field is used to store the captured image, also referred to as the image component, and the other bit field is used to store the noise prediction, also referred to as the noise component. A programmable number of bits can be assigned to each bit field. In operation, the image component of the frame buffer is updated with image data from digital image sensor 102. The noise component of the frame buffer is write-protected so that they will not be overwritten. Instead, system processor 240 updates the noise component with noise prediction values generated using the reference image stored in memory buffer 242 and the current and reference values of the operating parameters and by applying the system model of the noise relationship to the operating parameters.

In digital image processor 104, the subtraction of the noise component from the image component can be carried out using an arithmetic unit. Alternately, a lookup table can be used to perform the subtraction. In one embodiment, lookup table 230 is used to perform the subtraction of the noise component from the image component. Specifically, lookup table 230 subtracts n bits of noise component from 12-n bits of image component to generate the final pixel values and converts the final pixel values into binary 14 bit pixel values. The advantage of using a lookup table to perform the subtraction is that other complex operation can be performed at the same time as the subtraction.

When the fixed pattern noise subtraction method of the present invention is implemented in video imaging system 100, effective and accurate fixed pattern noise removal can be realized. The sensitivity of video imaging system 100 can be greatly improved, particularly for low illumination images.

The above detailed descriptions are provided to illustrate specific embodiments of the present invention and are not intended to be limiting. Numerous modifications and variations within the scope of the present invention are possible. For example, in the above description, the fixed pattern noise subtraction method of the present invention is implemented in a video imaging system. This is illustrative only and in other embodiments, the fixed pattern noise subtraction method of the present invention can be implemented in any digital imaging systems for still or motion images. Furthermore, the video imaging system described above can be modified for use as a still motion camera. Fixed pattern noise subtraction method of the present invention can be applied effectively in either still or motion imaging systems. The present invention is defined by the appended claims.

We claim:

1. A method for subtracting fixed pattern noise in a digital imaging system incorporating a digital image sensor, comprising:
   acquiring a reference image of the digital image sensor when the digital image sensor receives no illumination;
   storing a reference value of an operating parameter associated with the reference image, wherein the reference image is indicative of the fixed pattern noise associated with the digital image sensor when the operating parameter has the reference value;
   storing a model describing the behavior of the fixed pattern noise as a function of the operating parameter;
   acquiring a first image;
   measuring a current value of the operating parameter associated with the first image;
   calculating a noise prediction image by extrapolation of the reference image in accordance with the model and based on the current value and the reference value of the operating parameter; and
   subtracting the noise prediction image from the first image to generate a final image.

2. The method of claim 1, wherein acquiring a reference image of the digital image sensor comprises:
   acquiring a plurality of images using the digital image sensor when the digital image sensor receives no illumination; and
   for each pixel in the digital image sensor, averaging pixel values of the plurality of images, the averaged pixel values for each pixel forming the reference image.

3. The method of claim 2, wherein acquiring a plurality of images using the digital image sensor when the digital image sensor receives no illumination comprises:
   closing an aperture of the digital imaging system so that the digital image sensor is not exposed to illumination.

4. The method of claim 1, wherein the operating parameter comprises a temperature of the digital image sensor.

5. The method of claim 4, wherein storing a reference value of an operating parameter associated with the reference image comprises:
   providing a dark pixel in the digital image sensor, the dark pixel being permanently and totally shadowed; and
   measuring a leakage current associated with the dark pixel when the reference image is being acquired,
   wherein the leakage current of the dark pixel is the reference value used as an indicator of the temperature of the digital image sensor when the reference image is acquired.

6. The method of claim 5, wherein measuring a current value of the operating parameter associated with the first image comprises:
   measuring a leakage current associated with the dark pixel when the first image is being acquired,
   wherein the leakage current of the dark pixel is the current value used as an indicator of the temperature of the digital image sensor when the first image is acquired.

7. The method of claim 1, wherein the operating parameter comprises one of a temperature, an operating voltage, an exposure time, a location of the pixels in the digital image sensor, and the reset voltage of the digital image sensor.

8. The method of claim 1, wherein subtracting the noise prediction image from the first image comprises:
   determining an illumination level of the first image; and
   subtracting the noise prediction image from the first image only when the illumination level is less than a pre-determined threshold.

9. The method of claim 8, wherein determining an illumination level of the first image comprises:
   averaging a plurality of pixel values from the first image, the plurality of pixel values being selected from pixels distributed across the digital image sensor.

10. The method of claim 1, wherein subtracting the noise prediction image from the first image comprises:
    determining an illumination level of the first image;
    storing the noise prediction image in m bits when the illumination level is less than a pre-determined threshold;
    storing the noise prediction image in n bits, where n is less than m, when the illumination level is greater than a pre-determined threshold; and
    subtracting the noise prediction image from the first image.

11. An imaging system, comprising:
    a digital image sensor for performing image capture operations, comprising:
      a sensor array comprising a two-dimensional array of digital pixels, each digital pixel outputting digital signals as pixel data representing an image of a scene;
      an image buffer, in communication with the sensor array, for storing the pixel data; and
      a first processor, in communication with the image buffer and the sensor array, for controlling image capture and pixel data processing operations; and
    a digital image processor for performing image processing operations, comprising:
      a frame buffer, in communication with the digital image sensor, coupled to store the pixel data, wherein the frame buffer includes a first bit field for storing the pixel data for a first image and a second bit field for storing noise data associated with the sensor array;
      a second processor, in communication with the frame buffer, for processing the pixel data stored in the frame buffer; and
      a memory buffer, in communication with the second processor, for storing a reference image of the sensor array and a reference value of an operating parameter, wherein the reference image is indicative of the fixed pattern noise associated with the digital image sensor when the operating parameter has the reference value,
    wherein when the digital image sensor captures a first image, a current value of the operating parameter when the first image is acquired is measured; the second processor generates the noise data by extrapolating the reference image based on the reference value and the current value of the operating parameter and a model describing the behavior of the fixed pattern noise as a function of the operating parameter.

12. The imaging system of claim 11, wherein the reference image of the sensor array comprises an image of averaged pixel values of a plurality of images acquired using the digital image sensor when the digital image sensor receives no illumination.

13. The imaging system of claim 11, wherein the operating parameter comprises a temperature of the digital image sensor.

14. The imaging system of claim 13, wherein the sensor array comprises a dark pixel being permanently and totally shadowed, and the reference value of the operating parameter associated with the reference image comprises a leakage current value associated with the dark pixel in the sensor array, the leakage current being used as an indicator of the temperature of the digital image sensor when the reference image is acquired.

15. The imaging system of claim 14, wherein measuring a current value of the operating parameter associated with the first image comprises:
measuring a leakage current associated with the dark pixel when the first image is being acquired,
wherein the leakage current of the dark pixel is the current value used as an indicator of the temperature of the digital image sensor when the first image is acquired.

16. The imaging system of claim 11, wherein the operating parameter comprises one of a temperature, an operating voltage, an exposure time, a location of the pixels in the digital image sensor, and the reset voltage of the digital image sensor.

17. The imaging system of claim 11, wherein the second processor subtracts the noise data from the pixel data to generate a final image.

18. The imaging system of claim 17, wherein the second processor subtracts the noise data from the pixel data to generate a final image only when an illumination level of the first image is less than a pre-determined threshold.

19. The imaging system of claim 17, wherein the digital image processor further comprises a lookup table in communication with the frame buffer and the second processor and operating to perform the subtraction of the noise data from the pixel data of the first image.

20. The imaging system of claim 17, wherein the digital image processor further comprises an arithmetic unit in communication with the frame buffer and the second processor and operating to perform the subtraction of the noise data from the pixel data of the first image.

* * * * *

UNITED STATES PATENT AND TRADEMARK OFFICE
CERTIFICATE OF CORRECTION

PATENT NO.        : 7,280,141 B1                                             Page 1 of 1
APPLICATION NO.   : 10/670014
DATED             : October 9, 2007
INVENTOR(S)       : Michael Frank and Ricardo J. Motta It is certified that error appears in the above-identified patent and that said Letters Patent is hereby corrected as shown below:

On the Title Page, after Item (76) please add
Item [73] --Assignee: PIXIM, Incorporated, Mountain View, CA (US)--.

Signed and Sealed this

Seventeenth Day of June, 2008

JON W. DUDAS
*Director of the United States Patent and Trademark Office*